United States Patent [19]

Robison

[11] Patent Number: 4,683,780

[45] Date of Patent: Aug. 4, 1987

[54] SAW CHAIN SHARPENER

[76] Inventor: Arthur E. Robison, 6720 Bent Oak Highway, Adrian, Mich. 49221

[21] Appl. No.: 818,332

[22] Filed: Jan. 13, 1986

[51] Int. Cl.$^4$ .............................................. B23D 63/16
[52] U.S. Cl. ...................................... 76/40; 76/78 R
[58] Field of Search ................. 76/25 A, 37, 40, 78 R

[56] References Cited

U.S. PATENT DOCUMENTS

| | | | |
|---|---|---|---|
| 2,792,724 | 5/1957 | Durall | 76/25 A |
| 2,986,048 | 5/1961 | Nielsen | 76/37 |
| 3,020,783 | 2/1962 | Hill | 76/37 |
| 3,071,026 | 1/1963 | DeWitt | 76/40 |
| 3,877,324 | 4/1975 | Silvey | 76/25 A |
| 4,254,673 | 3/1981 | Simington | 76/25 A |
| 4,299,142 | 11/1981 | Kaye | 76/25 A |
| 4,319,502 | 3/1982 | Smith | 76/25 A |
| 4,336,726 | 6/1982 | Silvey | 76/25 A |
| 4,416,169 | 11/1983 | Silvey | 76/25 A |
| 4,463,630 | 8/1984 | Turner | 76/25 A |

FOREIGN PATENT DOCUMENTS 2828496 1/1980 Fed. Rep. of Germany .
2940430 4/1981 Fed. Rep. of Germany .
2521470 8/1983 France .

Primary Examiner—Roscoe V. Parker
Attorney, Agent, or Firm—Jeffers, Hoffman & Niewyk

[57] ABSTRACT

A saw chain sharpener for sharpening the left hand and right hand cutting teeth and the rakers of a saw chain while the chain is mounted in situ on a saw bar. The apparatus includes a base, a saw bar clamp mounted on the base for clamping a saw bar in a substantially vertical position. A grinding assembly including an electric motor and a grinding wheel is mounted respectively on first or second grinding assembly mounting posts. The mounting posts are secured on opposite sides of the saw bar clamp. The apparatus also includes an indexing device mounted on the bar clamp and which is spaced from the grinding surface of the grinding wheel when the grinding wheel is pivoted into the grinding position for selective supporting engagement with the rear edges of the saw chain cutting links. The saw chain can therefore move forwardly but not rearwardly when the indexing tooth is in position. The indexing device is adjustable to determine the lengths to which the cutting teeth are to be ground.

20 Claims, 8 Drawing Figures

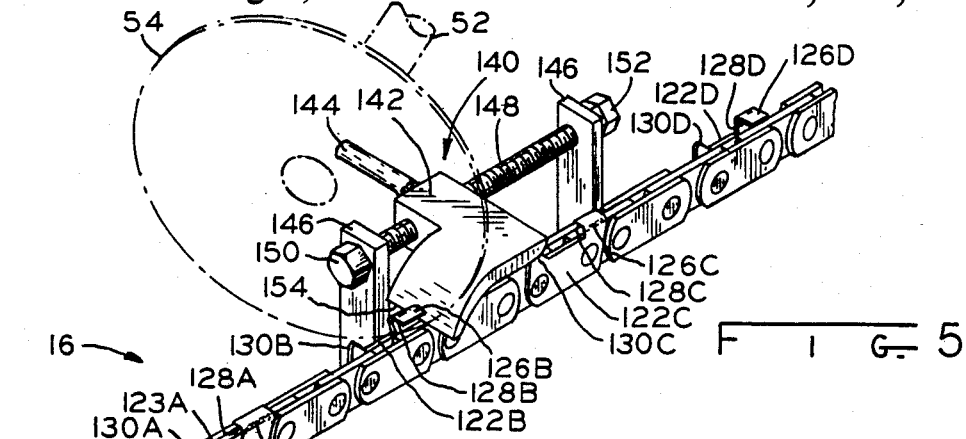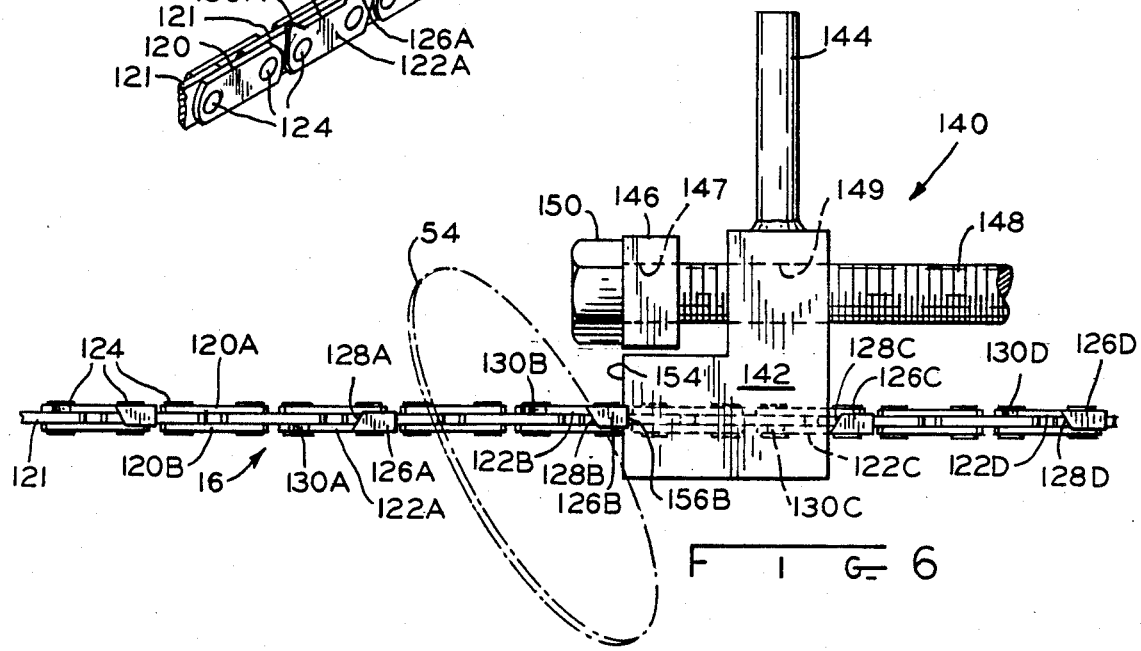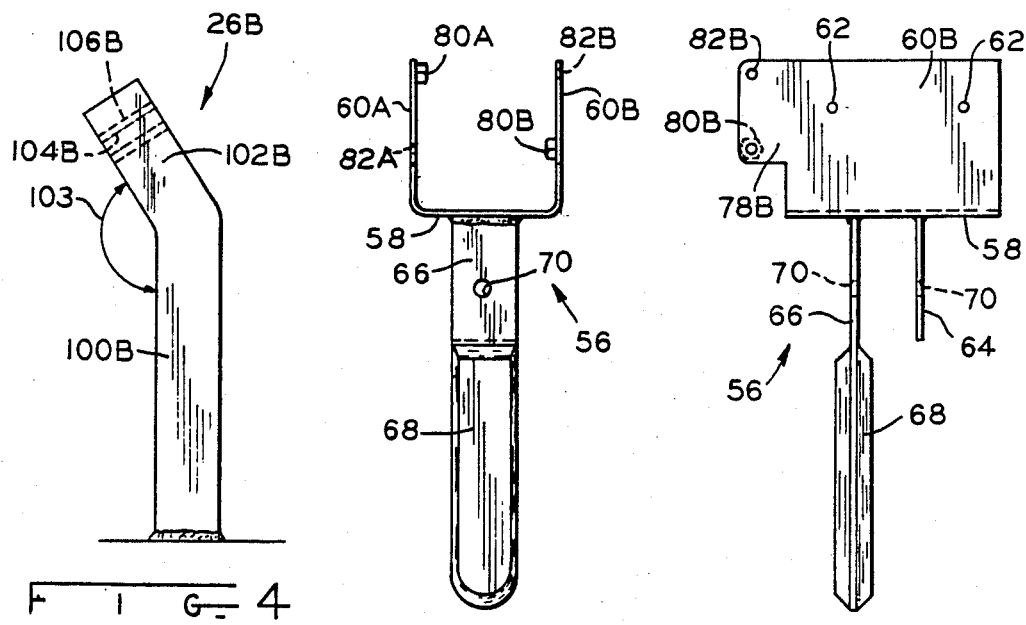

SAW CHAIN SHARPENER

BACKGROUND OF THE INVENTION

This invention relates to a sharpening apparatus for sharpening the cutter elements and grinding the rakers of a chain saw chain. Chain saws in general include a chain guide bar on which is mounted a saw chain having a plurality of cutting elements or teeth whose cutting edges are inclined with respect to the direction of the movement of the saw chain and which are undercut or raked at a predetermined angle. Such chain cutting elements must be sharpened relatively frequently and the rakers periodically ground to maintain maximum cutting efficiency of the saw. Hand sharpening of a chain is both time consuming and furthermore will not generally result in optimum cutting edges since it requires a great deal of skill on the part of the operator to properly sharpen a chain and few people possess such skill. Additionally there is a tendency, when hand sharpening a chain, to remove too much material from the cutting teeth of the chain, thereby reducing the life of the chain.

Saw chain grinding machines have been provided in the prior art for sharpening saw chains but these machines have had a number of disadvantages. In many of these machines the chain must be removed from the saw bar and mounted on a special holder on the grinder, clamped in the holder, and adjusted with respect to the grinding wheel before the grinding operation can proceed. Then, after grinding, the chain must be removed from the special holder and remounted and readjusted on the saw bar. All of those operations add up to a very time consuming operation.

Prior art grinding machines also are generally designed for commercial establishments and therefore tend to be relatively heavy and difficult to move. The chain saw operator must therefore remove the saw chain and take it to a commercial establishment for sharpening. It is therefore necessary for an operator to have several chains available to avoid lost production time.

A further disadvantage of the prior art machines is that they have been relatively complicated and difficult to adjust. Quite often a saw operator will hand sharpen a chain several times before bringing the chain in to a sharpening establishment to be ground. Because of the inability to control the hand sharpening process, and the resulting non-uniform cutting edges, commercial establishments attempt to make the cutting elements uniform in length and will grind off a substantial amount from the cutting edges of the teeth to insure that all the teeth are of equal size. Thus, much material is usually removed from the teeth in such operations, thereby shortening the life of the chain.

Still other prior art grinding machines have been provided which mount directly on the saw bar and therefore are more portable than the above referred to types of commercial grinding machines. A disadvantage of these bar mounted types of grinding machines is that they are rather difficult to adjust and use and therefore will not generally result in optimum sharpening of the chain. In most of these devices the grinding machine has to be dismounted, remounted and adjusted to grind the opposite set of cutter teeth of the saw chain. It is therefore desired to provide a chain sharpening apparatus whereby the chain can be ground in situ on the bar, which is simple to use and adjust, and whereby the grinding apparatus can be used to grind both the right hand and left hand teeth of the chain by a simple repositioning of the grinding apparatus motor and grind wheel assembly without readjustment of the grinding machine. It is also desired to provide such a sharpening apparatus which may be used to accurately grind the rakers of the teeth. It is furthermore desired to provide such an apparatus having a simple index mechanism to control the amount of material to be removed from the individual saw teeth.

In one prior art patent, U.S. Pat. No. 3,877,324, a grinding apparatus is provided for grinding a saw chain in situ wherein the saw is mounted on the grinding apparatus with the saw bar in a clamping device and the saw motor supported on a support table. The teeth on one side of the chain are first sharpened whereafter the entire saw will be rotated with respect to the central vertical axis on which the grinding wheel and motor is mounted for grinding the teeth on the other side of the chain. This sharpening apparatus, while preferable over the other prior art chain saw sharpening devices, has the disadvantage of being relatively complicated and bulky and difficult to adjust.

SUMMARY OF THE INVENTION

The present invention overcomes the disadvantages and problems associated with the prior art saw chain sharpeners by providing an improved chain saw sharpening apparatus therefore.

The present invention comprises a base, a clamping assembly mounted on the base for clamping a saw bar in a substantially vertical orientation, a pair of posts mounted on respective opposite sides of the clamping assembly and a grind wheel assembly which may be selectively mounted on either one of the posts for respectively grinding the left hand and right hand teeth of the chain and for grinding the rakers of the teeth. Stops are provided for limiting the downward movement of the grinding wheel and thereby preventing removal of too much material from the cutter links and/or the rakers. Additionally, an indexing mechanism is provided whereby the amount of material to be removed from the cutting edges of the teeth may be controlled.

One advantage of the apparatus of the instant invention is that the chain does not need to be removed from the saw bar and may be sharpened in situ.

Another advantage of the grinding apparatus of the instant invention is that adjustment of the grinding apparatus is very simple.

A further advantage of the apparatus of the instant invention is that the saw remains in place and only the grinding assembly is moved from one mounting post to the other to sharpen the teeth and grind the rakers on the opposite side of the saw chain without further adjustment of the grinding apparatus.

A still further advantage of the instant invention that it is relatively small and is easily portable so that it may be used on location to sharpen the teeth of a chain saw.

Yet another advantage of the instant invention that it is economical and simple to operate.

The instant invention, in one form thereof, comprises an apparatus for sharpening the left hand and right hand cutting teeth of a saw chain and for grinding the rakers of the teeth while the chain is mounted on a saw. The apparatus comprises a base, a saw bar clamping means mounted on the base for clamping a saw bar in a substantially vertical position. A grinding assembly including an electric motor having a rotatable output shaft and a grinding wheel mounted thereon for rotation with the shaft is pivotably supported on first and second grinding assembly mounting posts. The grinding assembly mounting posts are secured on the base respectively on opposite sides of the saw bar clamp. An indexing device is mounted on the saw bar clamp and is spaced from the grinding surface of the grinding wheel when the wheel is pivoted into the grinding position for selective supporting engagement with the rear edges of the saw chain cutting links to permit forward movement of the saw chain and to prevent rearward movement of the saw chain. The indexing device is adjustable to determine the length to which the cutting teeth are to be ground.

The invention, in one form thereof, further provides a saw chain sharpener for sharpening the cutting teeth of a saw chain, and for grinding the rakers of the teeth in situ on a chain saw guide bar. The sharpener comprises a base, a saw bar clamp including two spaced apart upstanding flanges for receiving a saw bar therebetween, an alignment device and a clamp for clamping a saw bar in a substantially vertical position. First and second grind wheel mounting posts are disposed respectively on opposite side of the bar clamp, an upper portion of each post being adapted to pivotably receive a grind wheel assembly. The grind wheel assembly includes a mounting bracket, an electric motor secured to the bracket and having an output shaft, and a grind wheel mounted on the motor output shaft. The bracket is adapted to be pivotably received on the respective posts. An index tooth is pivotably mounted on a pivot post for pivoting movement in a plane perpendicular to the saw bar. The index tooth includes an edge portion for engagement with the rear edges of the cutting teeth of a saw chain. The indexing tooth is adjustably mounted whereby the distance of the indexing tooth edge portion with respect to the grinding position of the grinding wheel may be varied.

The invention, is one form thereof, still further provides a saw chain sharpening apparatus comprising a base and a saw bar clamp including spaced apart vertically upstanding flanges for receiving a saw bar therebetween. A plurality of first pins is disposed in the space between the clamp flanges and is secured to a first of the flanges generally perpendicularly thereto for aligning the bar. At least one threaded pin is disposed in the space between the clamp flanges and is threadedly received in the second of the flanges generally perpendicularly thereto for clamping the bar. A grind wheel assembly includes an electric motor having an output shaft, a grind wheel mounted on the output shaft and a bracket secured to the motor. The bracket includes a pair of mounting ears having aligned apertures therein. A handle is attached to one of the ears. First and second tubular mounting posts is generally vertically mounted on the base respectively on opposite sides of the saw bar clamp. An upper portion of each of the posts includes an aperture adapted to receive a pivot pin. The pivot pin pivotably secures the grind wheel assembly selectively respectively to the first or second posts for pivotable movement of the grind wheel into a grinding position to sharpen the cutting teeth of the chain. Stops adapted to limit pivoting movement of the grind wheel are provided comprising first and second posts mounted on the base on opposite sides of the clamp. An indexing device is pivotably mounted on the clamp for maintaining the cutting teeth of a saw bar in position for grinding position, the indexing device being adjustable to selectively vary the length to which the teeth of the saw chain are ground by the grind wheel.

It is an object of the present invention to provide a chain saw sharpener which is easy to adjust and operate.

It is another object of the present invention to provide a chain saw sharpener wherein two grind wheel mounting posts are mounted on opposite sides of a clamping assembly whereby the right hand teeth and left hand teeth of the chain may be sharpened and the rakers may be ground by a simple relocation of the grinding assembly without further adjustment of the sharpener apparatus.

Still another object of the present invention is to provide a grinding apparatus for a saw chain wherein stops are provided to prevent the grind wheel from removing undesired material from the cutter elements and/or the rakers.

A yet further object of the present invention is to provide a saw chain sharpener including an improved indexing mechanism to select the length to which the cutting teeth of the saw chain are ground.

A still further object of the present invention is to provide a saw chain sharpener wherein the chain may be sharpened and the rakers ground in situ.

BRIEF DESCRIPTION OF THE DRAWINGS

The above mentioned and other features and objects of the invention and the manner of attaining them will become more apparent and the invention itself will be better understood by reference to the following description of an embodiment of the invention taken in conjunction with the accompanying drawings wherein:

FIG. 4 is a side elevational view of a grinder mounting column taken along line 4—4 of FIG. 3;

FIG. 5 is a perspective view of a portion of the saw chain sharpener of FIG. 1 with the grinding wheel in position to grind a cutting tooth and with the indexing tooth in position to retain the cutting tooth in a fixed position for grinding;

FIG. 6 is a broken away top plan view of a portion of the assembly of FIG. 1;

FIG. 7 is an elevational view of the motor mounting bracket;

FIG. 8 is a side elevational view of the motor mounting bracket of FIG. 7.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
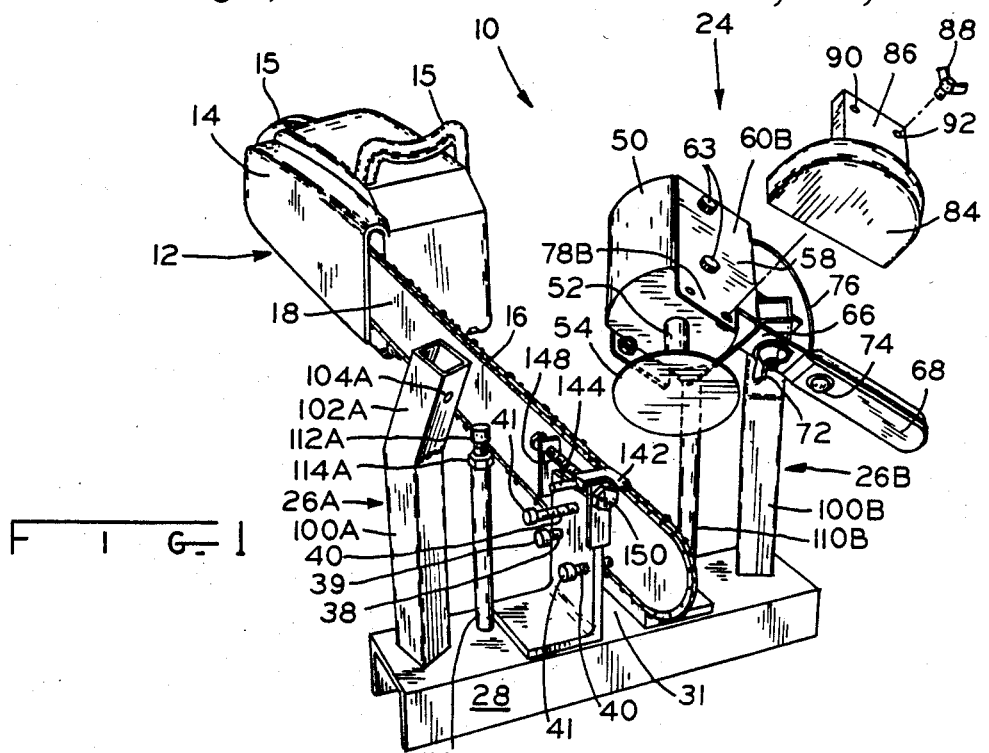
FIG. 1 is a perspective view of the saw chain sharpener according to a preferred embodiment of the present invention with a saw chain in position to be sharpened in situ mounted on a saw bar.

Referring now to FIG. 1 there is shown a perspective view of the saw chain sharpener apparatus 10 with a chain saw 12 clamped in position for sharpening the chain 16 thereof in situ. Chain saw 12 includes an engine and housing 14 therefor. The housing includes a pair of handles 15 secured thereto for operating chain saw 12. Chain saw 12 also includes a chain guide bar 18 on which chain 16 is rotatably mounted as is conventional.

Figure 2:
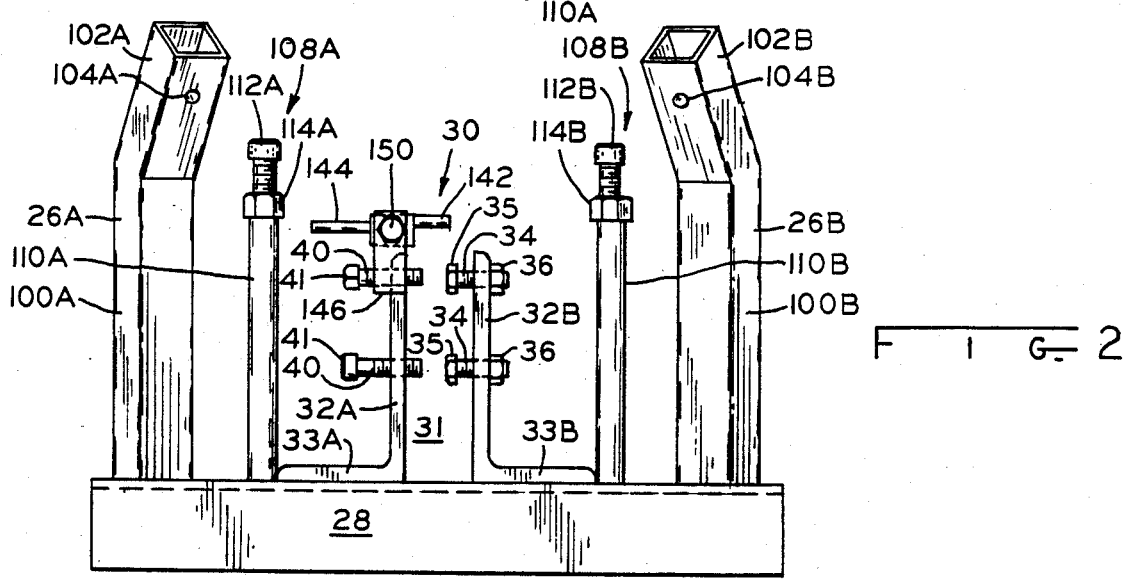
FIG. 2 is a front elevational view of the base bar clamp and grinder mounting assembly of the saw chain sharpener of FIG. 1.
Figure 3:
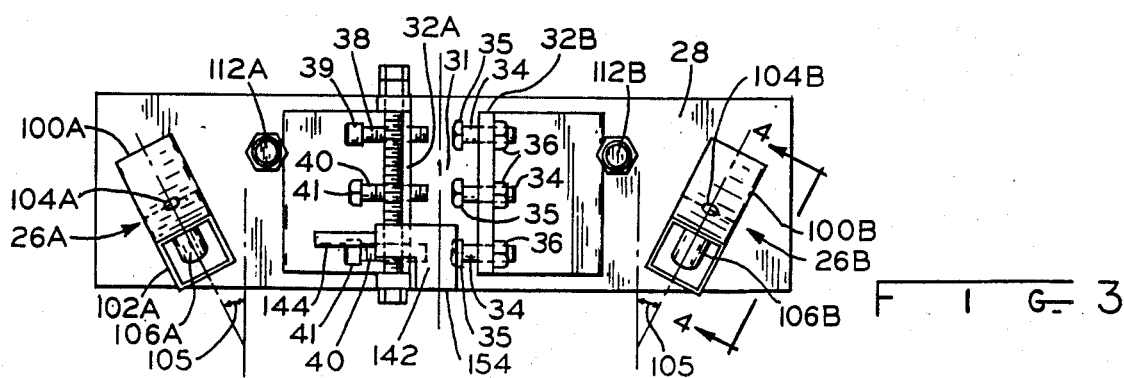
FIG. 3 is a top plan view of the base, saw bar clamp and grinder mounting assembly of the saw chain sharpener of FIG. 1.

Referring to FIGS. 1, 2, and 3, the saw chain sharpener apparatus 10 includes a grinder assembly 24 which, in the embodiment of FIG. 1, is mounted on a grinder mounting column 26b, which column is supported on a base 28. In the disclosed embodiment, base 28 is a generally U-shaped bracket although any convenient base or mounting platform may be used. Mounted on base 28 is a saw bar clamping mechanism 30 including a pair of spaced apart vertically upstanding clamp flanges 32a and 32b with a space 31 disposed therebetween, as best seen in FIG. 2. Flanges 32a and 32b, in the preferred embodiment, are L-shaped and include horizontally arranged flange portions 33a and 33b for mounting clamp flanges 32a and 32b on platform 28. Clamp flanges 32a and 32b may be secured to platform 28 in any convenient manner such as by bolting or by welding. Clamping assembly 30 also includes a plurality of aligning pins which, in the disclosed preferred embodiment, comprise three bolts 34. Bolts 34 are threaded into flange 32b and are locked in place by lock nuts 36 with bolt heads 35 in mutual alignment in a substantially vertical plane. Thus bolt heads 35 of bolts 34 provide a reference plane for the right hand surface of chain guide bar 18. Bolts 34 may be threaded into flange 32b to a greater or lesser extent to accommodate chain saw bars of various widths. Clamp flange 32a is provided with an alignment bolt 38 which is threaded into clamp 32a with bolt head 39 spaced outside of space 31. Bolt 38 is used to align chain saw bar 18. Thus, when the chain saw bar 18 is placed in space 31 between flanges 32a and 32b, bolt 38 is hand tightened to align blade 18 with the heads of bolts 34 and to clamp it lightly in position between bolts 34 and 38. A pair of cup point set screws 40 are threaded into flange member 32a with the heads 41 outside space 31 to secure bar 18 in place. Cup point set screws 40 should be tightened by means of a wrench or other suitable tool for establishing a witness mark on chain saw bar 18 for initial sharpening of chain 16 and for reference points for all subsequent grinding.

Referring further to FIGS. 1, 4, 7, and 8, grinder assembly 24 includes an electric motor 50 which, in the preferred embodiment, is a 1/15th horsepower motor which runs at 5000 rpm. It should be understood that other suitable motors may be used. Motor 50 may be operated from a conventional 120 V supply of electric power, from the battery of a vehicle or any other suitable electric source of power. Motor 50 includes an output shaft 52 on which a grind wheel 54 is securely mounted such as by means of a bolt (not shown) centrally located in the grind wheel 54. It should also be noted that grinding wheel 54, in the preferred embodiment, is a relatively thin fiberglass reinforced wheel of approximately 2½ inches in diameter and available from Norton Corp. of Worcester, MA. However, other suitable grinding wheels may also be used. Electric motor 50 is secured to a motor mounting bracket 56. As best seen in FIGS. 7 and 8, motor mounting bracket 56 includes a generally U-shaped bracket portion 58 having leg portions 60a and 60b each of which includes two apertures 62 through which pins or bolts 63 extend for securing motor 50 to bracket 56. Bracket 56 also includes a pair of hinge portions or ears 64 and 66 for hingedly securing bracket 56 to the respective mounting columns 26a and 26b. Hinge ear 66 is longer than hinge ear 64 and includes a handle portion 68 for operating the grinder assembly. Hinge ears 64 and 66 each include an aperture 70 through which a bolt (not shown) extends for pivotably securing bracket 56 to grinder mounting columns 26a and 26b. A wing nut 72 or other suitable fastener is threadedly secured to the grinder assembly mounting bolt (not shown) for assembling and retaining bracket 56 to either of columns 26a or 26b. An electric switch 74 may be provided on handle 68 for selectively operating motor 50. Wire 76 or suitable conductors connect switch 74 with electric motor 50.

Referring further to FIGS. 1, 7 and 8, legs 60a and 60b respectively include flanges 78a and 78b for securing a grind wheel guard 84 to bracket 56. Flanges 60a and 60b respectively include a nut 80a and 80b secured thereto such as by welding and further include apertures 82a and 82b. Guard 84 includes a guard flange 86 having a guide pin 90 secured thereto and further includes an aperture 92. Thus guard 84 may be secured to either flange 78a or flange 78b by means of a threaded wingbolt 88 or other suitable fastener which is disposed in aperture 92 and is threadedly received respectively in nut 80a or 80b. Pin 90 is disposed respectively in either aperture 82a or 82b. In the embodiment of FIG. 1, guard 84 is thus secured to flange 78b of leg 60b. However, if grinder assembly 24 where mounted on grinder mounting column 26a, leg 60a and flange 78a would be disposed in the uppermost position of bracket 56 whereby guard 84 would be secured to flange 78a. Thus moving grinding assembly 24 from column 26a to column 26b is a simple procedure which may be very quickly accomplished by loosening wingnut 72 and wingbolt 88 and reassembling the respective parts on the opposite column as described above. It should also be noted that guard 84 could also be a conventional rotating guard rather than the guard constructed as shown.

Referring now to FIGS. 1-4, each of grinder mounting columns 26a and 26b includes an upright portion 100 and an inclined portion 102. Portions 102 are inclined with respect to the vertical plane by an angle 103 which is in the range of 18 degrees to 25 degrees. This angle is determined by the preset rake angle of the saw chain cutters whereby, as grinder assembly 24 is assembled to inclined portions 102a or 102b, grind wheel 54 is inclined at the proper rake angle with respect to the vertical, to grind the proper rake angle on the cutting edges of the teeth of chain 16. Inclined portions 102a and 102b are provided with apertures 104a and 104b. Furthermore, in the preferred embodiment, a cylindrical tube 106a and 106b is welded in place in hollow inclined portions 102a and 102b as shown. Thus a bolt may be easily threaded through apertures 104a and 104b. To assemble grinder assembly 24 to mounting columns 26a or 26b, apertures 70 in hinge ears 64 and 66 are disposed respectively on opposite sides of portions 102a or 102b in alignment respectively with aperture 104a or 104b and a bolt (not shown) is threaded through apertures 70 and 104. Wingnut 72 is then threaded onto the bolt (not shown) for securing grinder assembly 24 in place.

Wingnut 72 should not be tightened too much so that the grinder assembly 24 may pivot about the bolt (not shown) for selectively pivoting grind wheel 54 into contact with the cutting edges of the teeth of chain 16 and/or rakers 130.

It should also be noted with reference to FIG. 3 that columns 26a and 26b are pivoted inwardly toward clamping assembly 30 whereby the plane of rotation of grind wheel 54 is disposed at an angle 105 with respect to the line of travel of chain 16. This angle is determined by the angle at which the cutting edges of the cutting teeth of chain 16 are disposed for optimum cutting efficiency of chain saw 12. This angle is preferable in the range of 27° to 34°. It should be noted that columns 26a and 26b are made from square tubular material. However, round tubing could be substituted therefor or columns 26a and 26b could be made of solid bar stock or any other suitable material. It should also be noted that the angle 105 at which columns 26a and 26b are pivoted inwardly toward clamping assembly 30 could be made to be adjustable if desired. Furthermore, the angle of inclination 103 for mounting column portions 102a and 102b with respect to the vertical plane could be made variable if desired.

Referring further to FIGS. 1–3, a pair of stops 108a and 108b is provided which respectively include upright portions 110a and 110b. Bolts 112a and 112b or other suitable adjustable devices are threadedly received respectively in portions 110a and 110b. Bolts 112a and 112b are locked in respective selected vertical positions by lock nuts 114a and 114b. Stops 108a and 108b are provided for limiting the downward movement of pivoting grinder assembly 24 as it is pivoted downwardly by the operation of handle 68 to grind the teeth of chain 16 and/or the rakers of the teeth. If stops 108a and 108b are adjusted too low, grinding wheel 54 will grind an undesired amount of material from the chain saw cutter links and/or rakers of said cutter links, as further explained hereinafter.

Referring now to FIGS. 1, 5 and 6, chain 16 comprises a plurality of tie straps 120 connected to drive links 121 by means of rivets 124. Furthermore, cutter links 122 are secured to drive links 121 by means of rivets 124. Each cutter link includes a cutter portion 126 including a cutting edge 128 and a raker 130. Cutting edges 128 of cutter portions 126 and rakers 130 are disposed above the tops 123 of cutter links 122. It should also be noted, with special reference to FIGS. 5 and 6, that alternate cutter links 122 have their cutter portions 126 and rakers 130 disposed on opposite sides of chain 16. Furthermore, the angles of cutting edges 128 alternate as shown. Thus links 122a and 122c, which are located on the right hand side of the chain as viewed in FIGS. 5 and 6, have their leading cutter portions 126a and 126c on the right hand side of the chain. On the other hand cutter links 122b and 122d are disposed on the left hand side of chain 16 and therefore have their leading cutter portions 126b and 126d on the left hand side of chain 16. This alternating configuration of cutter portions 126 necessitates adjustment of grinder assembly 24 to provide the proper grinding angle of grinding wheel 54 for sharpening the right hand side cutting edges 128a and 128c and the left hand side cutting edges 128b and 128d. The proper angles for grinder assembly 24 are provided by the inward pivoted orientation of grinder mounting columns 26a and 26b as explained hereinabove.

Referring further to FIGS. 5 and 6, an indexing mechanism 140 is provided including a pivoting indexing tooth 142 operated by means of lever 144. Indexing tooth 142 is pivotably secured to two flanges 146 by means of a threaded bolt 148 which is rotatably disposed in apertures 147 of flanges 146. Index tooth 142 includes a threaded aperture 149 in which bolt 148 is disposed. Bolt 148 includes a hexagonal head 150 and is locked in position against axial movement in flanges 146 by means of a lock nut 152. Indexing tooth 142 is therefore rotatable about an axis which is parallel to the direction of travel of chain 16. Handle 144 may be operated to pivot index tooth 142 upwardly to enable placing a saw bar 18 in position in space 31 and then to pivot indexing tooth 142 downwardly for engagement of front edge 154 of indexing tooth 142 with a rear edge 156 of a cutter link 122. Thus as best seen in FIG. 6, with grinding wheel 54 in its grinding position, wheel 54 will exert a rearward force on cutter link 122b as wheel 54 grinds the cutting edge 128b of cutter portion 126b. However, link 122b cannot move backward because indexing tooth 142 whose front edge 154 is in contact with rear edge 156b of cutter link 122b prevents such backward movement. It should also be noted that the forward and rearward adjustment of indexing tooth 142 is accomplished by turning hex head 150. Preferably bolt 148 has 20 threads per inch whereby rotation of hex head 150 advances the thread 1/5 or 0.010 inches. Thus, adjustment of the exact position of indexing tooth 142 is easily achieved. This adjustment ensures that the distance between the grinding surface of wheel 54 and edge 154 is fixed whereby the cutter portions 126 of all cutter links 122 will be ground to a uniform length.

OPERATION

In operation, chain saw sharpener 10 is placed on any suitable surface and chain saw 12 is aligned with bar 18 disposed in space 31 between vertical clamp flanges 32a and 32b. Bar 18 is adjusted so that the top of chain 16 will be properly positioned and indexing tooth 142, when in the horizontal position, will properly support cutter links 122 during the grinding operation. Saw bar 18 and saw chain 16 may even be somewhat tilted with respect to the horizontal and base 28 may also be slightly tilted to accommodate the tilt of saw 12 since it is only the relative positioning of chain 16 with respect to indexing tooth 142 which is important.

After bar 18 has been properly positioned, aligning bolts 38 are threaded inwardly to snugly engage saw bar 18. After final positioning of saw bar 18, cup point set screws 40 are tightened with a wrench to securely clamp bar 18 in position. Indexing tooth 142 is now pivoted to its horizontal position whereby front edge 154 will engage rear edge 156 of a cutter link 122. Grinder assembly 24 is pivoted downwardly and aligned into position with the cutting edge 128 of cutter link 122. It should be noted that, while grinder assembly 24 may be mounted on either grinder mounting column 26a or 26b, the proper cutter links 122, either left hand or right hand, should be aligned with grinding wheel 54. Thus, with grinding wheel 54 in the position shown in FIG. 1, cutter link 122b should be aligned with indexing tooth 142 and grinding wheel 54. After rotation of chain 16 for alignment of the proper cutter link 122 with grinding wheel 54, bolt 148 is rotated to adjust the distance between front edge 154 of indexing tooth 142 and the grinding surface of wheel 54 whereby the length to which cutter portion 126 is to be ground is determined.

Virtually infinite adjustment of indexing tooth 142 is possible because of the threaded engagement of indexing tooth 142 with bolt 148. As a final adjustment, stops 108 should be adjusted so that grinding wheel 54 will not grind into the top edge 123 of cutter links 122. The angle at which the grind wheel grinds cutter edges 128 is automatically provided for by the forward tilt of inclined portions 102a and 102b of grinder mounting columns 26a and 26b. Switch 74 is now operated to turn on motor 50 and grinding wheel 54 is then pivoted downwardly about its pivoting bolt (not shown) by means of handle 68 for grinding the aligned cutter link 122. After a cutter link 122 has been ground grinder assembly 24 is pivoted upwardly, chain 16 is rotated forwardly to align a new cutter link 122 with grind wheel 54 and grinder assembly 24 is pivoted downwardly to grind the next cutter link 122. This process is repeated for all of the cutter links 122 on the same side of chain 16. Grinder assembly 24 is then dismounted from column 26a or 26b and is mounted on the opposite column 26a or 26b. It should be noted that grind wheel guard 84 should also be reversed to the other side of motor mounting bracket 56 during this procedure as explained hereinabove. It should also be noted that indexing tooth 142 need not be aligned when assembly 24 is reversed since the same adjustment should hold for the left hand side and right hand side cutter links 122 of saw chain 16. Thus no further adjustments are necessary other than the disassembly of grinder assembly 24 from one column 26 and the assembly thereof to the opposite column 26. After all of cutter links 122 of chain 16 have been sharpened, bolts 38 and 40 are loosened and saw bar 18 is moved out of space 31 between flanges 32a and 32b.

When cutter edges 128 of cutter links 122 become too low in proportion to rakers 130 from subsequent sharpenings, it becomes necessary to decrease the height of the rakers 130 in order to maintain proper cutting depth of cutter portions 126. Motor assembly 24 is mounted on grinder mounting column 26 and motor switch 74 is off. Indexing tooth 142 is not used in the grinding operation of the raker 130 and is disengaged by complete rearward adjustment against flange 146 and is locked in place above and clear of cutter edges 128 to assure free movement of chain 16. Motor assembly 24 is pivoted downwardly so that grinding wheel 54 is located in the space between a raker 130 and a cutter edge 128 of a cutter link 122. Locknut 114 of upright portion 110 is loosened; a bolt 112 is adjusted so grinder wheel 54 clears rakers 130. The bolt 112 is then adjusted to lower grinder assembly 24 to grind rakers 130 to the desired height and is locked in place with a locknut 114. Motor switch 74 is turned on and saw chain 16 is moved backward and forward by hand until a raker 130 is ground to the desired height. Grinder assembly 24 is pivoted completely upwardly and saw chain 16 is moved by hand to the next raker 130 and the operation is repeated until all rakers 130 on saw chain 16 are ground.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. An apparatus for sharpening the left and right hand cutting teeth of a saw chain and grinding the rakers while said chain is mounted on a saw bar and comprising:
    a base adapted for support by a substantially horizontal surface;
    saw bar clamping means mounted on said base for clamping a saw bar in a substantially vertical position;
    a grinding assembly including an electric motor having a rotatable output shaft and a grinding wheel mounted on said shaft for rotation therewith;
    first and second grinding assembly mounting means for pivotably supporting said grinding assembly, said mounting means secured on said base respectively on opposite sides of said bar clamping means; and
    indexing means mounted on said clamping means and spaced from the grinding surface of said grinding wheel when said wheel is pivoted into the grinding position for selective supporting engagement with the saw chain cutting teeth to permit forward movement of a saw chain and to prevent rearward movement of said saw chain, said indexing means being adjustable to select the length to which said cutting teeth are to be ground.

2. The apparatus of claim 1 wherein, said first and second grinding assembly mounting means comprise respective first and second generally vertical columns, each said columns including a pivot pin receiving means for receiving a pivot pin to pivotably secure said grinding assembly to said columns, said grinding wheel, in its supported position on said respective first and second columns, being pivotable into alignment with the cutting edges of the respective left and right hand cutting teeth of the saw chain.

3. The apparatus of claim 1 including stop means for limiting the downward pivoting movement of said grinding wheel, said stop means being adjustable to adjust the end grinding position of said grinding wheel.

4. The apparatus of claim 1 wherein said clamping means comprises two spaced apart upstanding flange members for receiving a saw bar therebetween, and bar guide means disposed in the space between said flange members perpendicularly to said flange members for clamping said bar therebetween, said bar guide means being adjustable whereby said clamping means can accommodate saw bars of various thicknesses.

5. The apparatus of claim 4 wherein said bar guide means comprises a plurality of first pins secured to a first of said flange members and at least one second pin threadedly received in the second of said flange members.

6. The apparatus of claim 2 wherein each said columns comprise a first generally vertical portion and a second portion secured to the upper end of said first portion, said second portions inclined forwardly and inwardly toward said clamping means, said second portions each including an aperture for receiving a said pivot pin.

7. The apparatus of claim 1 wherein said grinding assembly includes a bracket, said electric motor secured to said bracket, said bracket including a handle and means for pivotably securing said grinding assembly to said first and second mounting means.

8. The apparatus of claim 1 wherein said indexing means comprises an index tooth, said tooth being pivotably mounted on a tooth mounting means to pivot about a horizontal axis which is parallel to and laterally offset from the substantially vertical plane of said bar.

9. The apparatus of claim 8 wherein said tooth includes a generally forwardly and downwardly inclined portion for engagement with the rear edges of said saw teeth.

10. A saw chain sharpener for sharpening the cutting teeth and the rakers of a saw chain in situ on a chain saw guide bar, the sharpener comprising:
- a base adapted for support by a substantially horizontal surface;
- a saw bar clamp including two spaced apart upstanding flanges for receiving a saw bar therebetween, alignment means and adjustable clamping means for clamping the saw bar in a substantially vertical position;
- first and second grind wheel mounting posts disposed respectively on opposite sides of said bar clamp, an upper portion of each said post adapted to pivotably receive a grind wheel assembly;
- a grind wheel assembly including a mounting bracket, an electric motor secured to said bracket and including an output shaft, a grind wheel mounted on said motor output shaft, said bracket including means adapted to be pivotably received on said respective posts; and
- an index tooth pivotably mounted on a pivot post for pivoting movement in a plane perpendicular to said saw bar, said tooth including an edge portion for engagement with the rear edges of the cutter links of a saw chain, said indexing tooth being adjustably mounted whereby the distance of the said indexing tooth edge portion with respect to the grinding position of said grinding wheel may be varied.

11. The saw chain sharpener of claim 10 including stop means for limiting the extent of pivoting movement of said grinding wheel, said stop means being adjustable to adjust the extreme grinding position of said grinding wheel.

12. The saw chain sharpener of claim 10 wherein each said post comprises a first generally vertical portion secured to said base and a second portion secured to the upper end of said vertical portion, said second portion inclined forwardly and inwardly toward said saw bar clamp, each said second portion including an aperture for receiving a pivot pin.

13. The saw chain sharpener of claim 12 wherein said posts are comprised of square tubes.

14. The saw chain sharpener of claim 10 wherein said aligning means comprises a plurality of bolts threaded into a first of said upstanding flanges, the heads of said bolts disposed in the space between said flanges and aligned in a generally vertical plane, said clamping means comprising at least one bolt threaded into the second of said upstanding flanges, the head of said bolt disposed outside the space between said flanges.

15. The saw chain sharpener of claim 10 wherein said motor mounting bracket includes a pair of flanges, each said flanges including an aperture, said apertures alignable with an aperture in each said respective mounting posts, and a pin receivable in said mounting post apertures and in said flange apertures for pivotably mounting said bracket on said respective posts, one of said flanges being longer than the other of said flanges and provided with a handle portion for pivoting said motor bracket.

16. The saw chain sharpener of claim 10 wherein said pivot post comprises a threaded pin threadedly engaging said tooth, said pin rotatably secured to said saw bar clamp, whereby rotation of said pin causes relative movement of said tooth with respect to said saw bar in the axial direction of said saw chain to selectively accommodate a predetermined cutting tooth length between said index tooth edge portion and said grinding wheel.

17. A saw chain sharpening apparatus comprising:
- a base adapted for support by a substantially horizontal surface;
- a saw bar clamp including two spaced apart vertically upstanding flanges for receiving a saw bar therebetween, a plurality of first pins disposed in said space and secured to a first of said flanges generally perpendicularly thereto for aligning said bar, at least one threaded pin disposed in said space and threadedly received in the second of said flanges generally perpendicularly thereto for clamping said bar;
- a grind wheel assembly including an electric motor having an output shaft and a grind wheel mounted thereon, a bracket secured to said motor and including a pair of mounting ears having aligned apertures therein, and a handle attached to one of said ears;
- first and second tubular mounting posts generally vertically mounted on said base, respectively on opposite sides of said saw bar clamp, an upper portion of each said posts including an aperture adapted to receive a pivot pin, said pivot pin pivotably securing said grinding wheel assembly selectively respectively to said first and second posts for pivotable movement of said grind wheel into a grinding position to sharpen the cutting teeth of said chain;
- stop means comprising first and second posts mounted on said base on opposite sides of said clamp and adapted to limit the pivoting movement of said grind wheel; and
- an indexing means pivotably mounted on said clamp for maintaining the cutting teeth of a saw bar in a grinding position, said indexing means being adjustable to selectively vary the length to which the teeth of a saw chain are ground by said grind wheel.

18. The saw chain sharpening apparatus of claim 17 wherein said tubular mounting posts each include a first generally vertical portion and a second portion secured to the upper end of said vertical portion, said second portion, said second portion inclined forwardly and inwardly toward said clamping means, said second portions each including a said pin receiving aperture.

19. The saw chain sharpening apparatus of claim 17 and including a mounting means for said indexing means, said mounting means comprising a threaded pin threadedly engaging said indexing tooth, said pin rotatably secured to said bar clamping means generally parallel to the plane of said saw bar clamp flanges whereby rotation of said pin causes relative movement of said indexing tooth in the axial direction of said saw chain and whereby said indexing tooth may be pivoted away from the space between said flanges to enable insertion of a saw bar between said flanges.

20. The saw chain sharpening apparatus of claim 19 wherein said indexing tooth comprises a generally forwardly downwardly inclined portion adapted for engagement with a rear portion of the cutter links of a saw chain.

* * * * *

UNITED STATES PATENT AND TRADEMARK OFFICE
CERTIFICATE OF CORRECTION

PATENT NO. : 4,683,780

DATED : August 4, 1987

INVENTOR(S) : Arthur E. Robison

It is certified that error appears in the above-identified patent and that said Letters Patent is hereby corrected as shown below:

Claim 18, Col. 12, line 48-49, delete "said second portion,"

Signed and Sealed this

Fifteenth Day of December, 1987

Attest:

DONALD J. QUIGG

Attesting Officer

Commissioner of Patents and Trademarks